May 19, 1931. E. WARNER 1,805,746
SCREW MACHINE
Filed Jan. 30, 1930   6 Sheets-Sheet 4

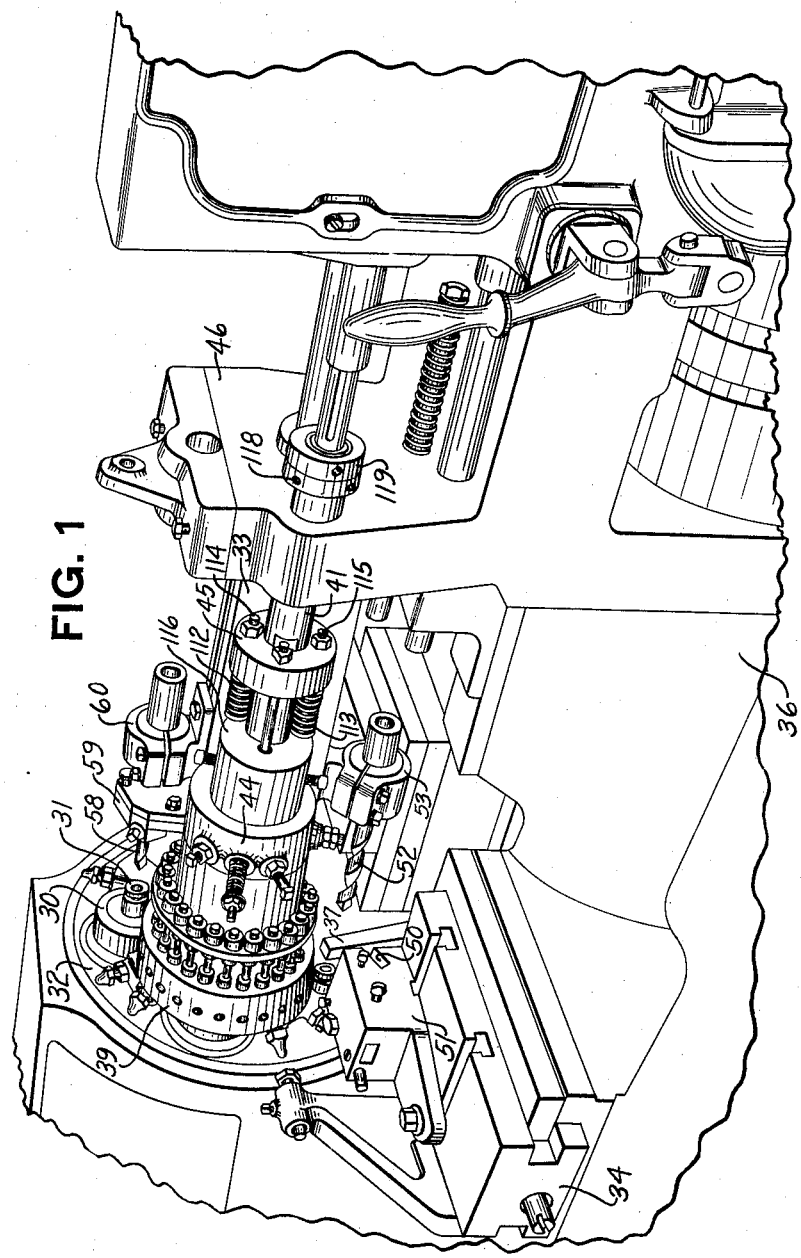

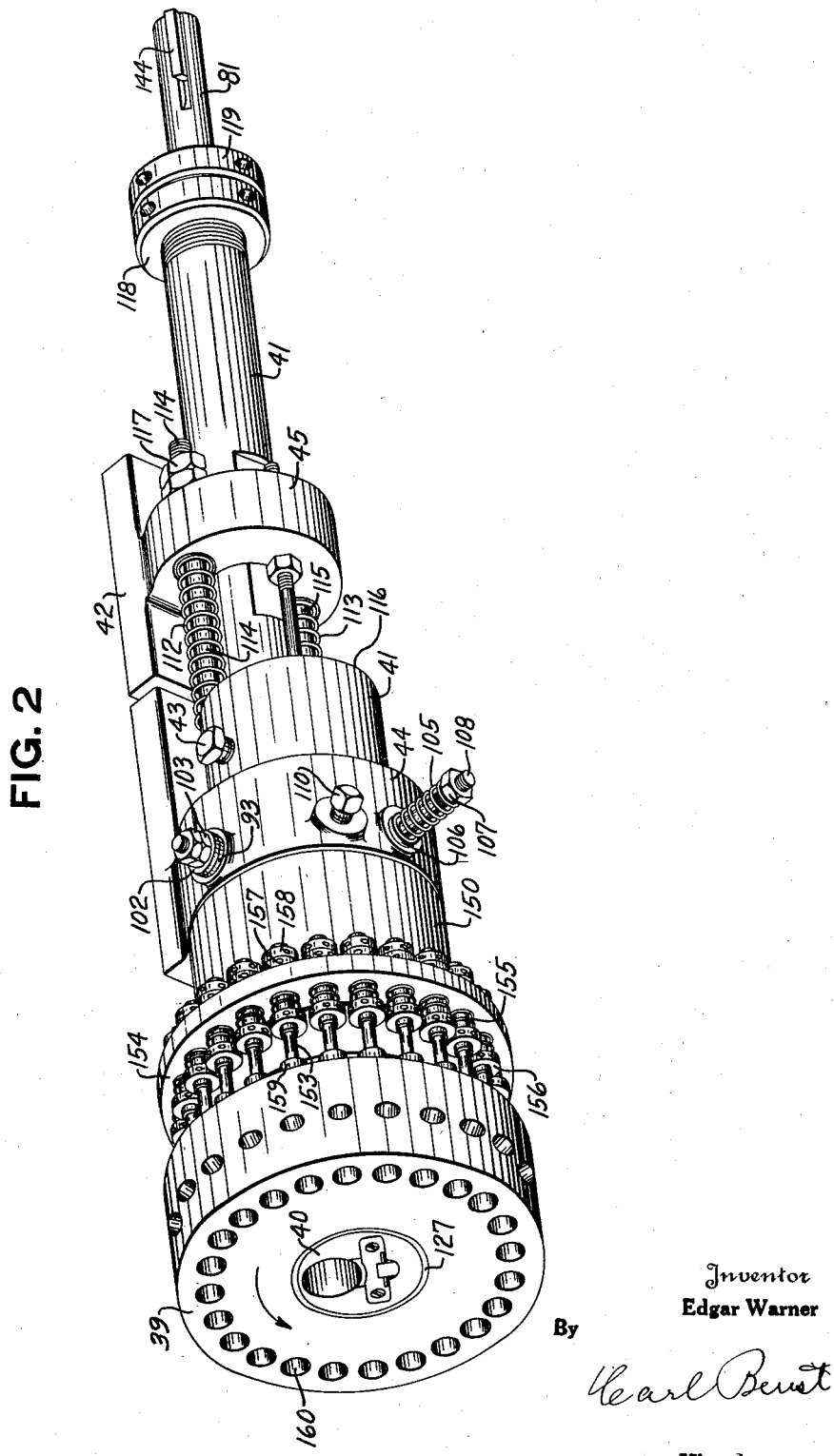

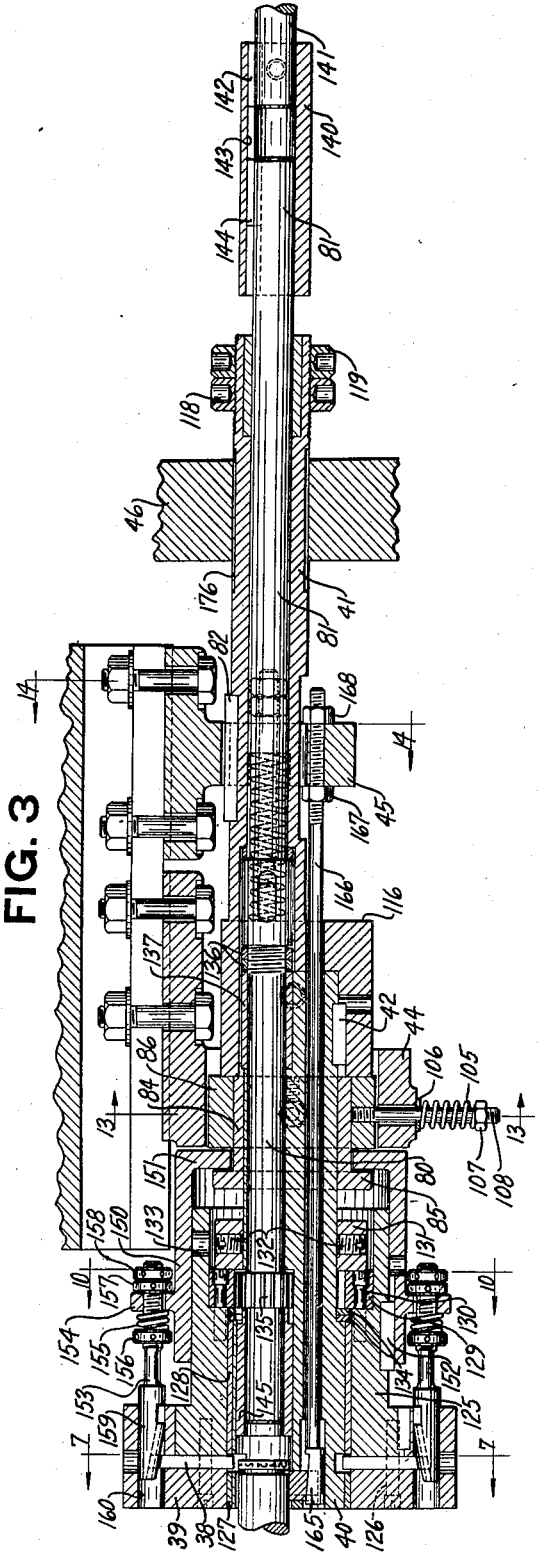

Inventor
Edgar Warner
By
Earl C. Benst
His Attorney

May 19, 1931.  E. WARNER  1,805,746
SCREW MACHINE
Filed Jan. 30, 1930  6 Sheets-Sheet 5

Inventor
Edgar Warner
By Carl Benst
His Attorney

May 19, 1931.  E. WARNER  1,805,746
SCREW MACHINE
Filed Jan. 30, 1930   6 Sheets-Sheet 6
FIG. 15
FIG. 16
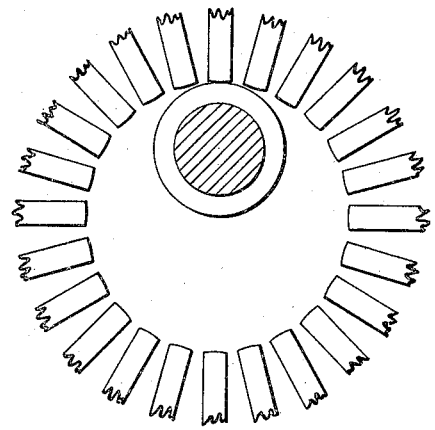
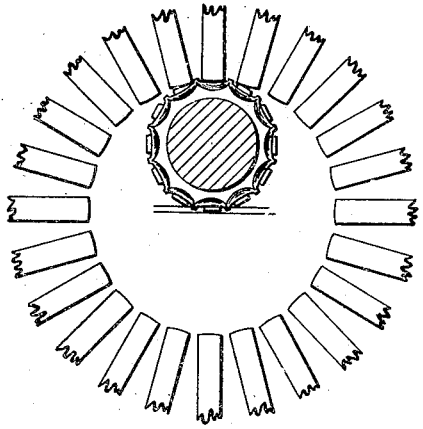
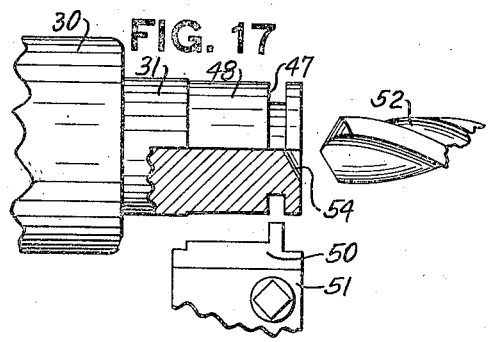
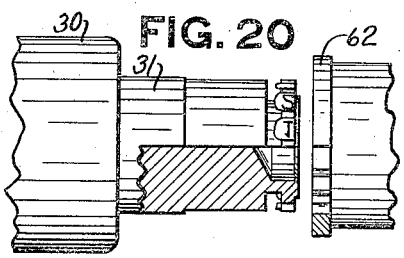
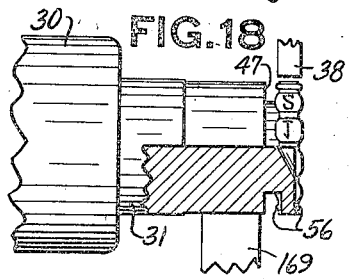
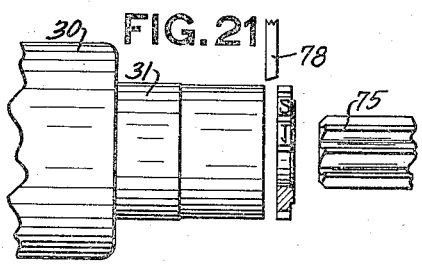
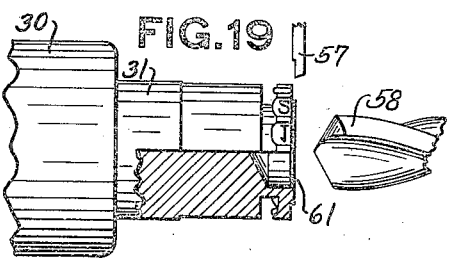
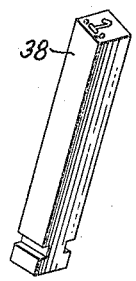
Inventor
Edgar Warner
By
His Attorney Patented May 19, 1931

1,805,746

UNITED STATES PATENT OFFICE

EDGAR WARNER, OF DAYTON, OHIO, ASSIGNOR TO THE NATIONAL CASH REGISTER COMPANY, OF DAYTON, OHIO, A CORPORATION OF MARYLAND

SCREW MACHINE

Application filed January 30, 1930. Serial No. 424,693.

This invention relates to knurling machines and has more particular reference to improvements in knurling attachments for automatic screw machines.

The knurling device forming the subject matter for the present application is adapted to be used on multiple-spindle screw machines of any conventional type, but a machine of the National Acme type is chosen for illustrative purposes. However, it is to be understood that with but few mechanical changes the knurling device may, without departing from the spirit of the invention, be readily adapted for use on any of the conventional types of screw machines now on the market.

Heretofore in the manufacture of type wheels, in order to form accurate characters, resort was made to engraving machines. Before the wheels can be engraved however it is necessary to blank them out, that is, manufacture a blank wheel, which is then placed in an engraving machine where the characters are engraved thereon successively, one at a time. This method, while providing excellent results, requires considerable time since the type wheels must be placed manually in the proper position in the engraving machine.

Probably the fastest and most economic engraving of certain type wheels is at present accomplished on the automatic engraving machine disclosed in the patent to Howard B. Scott et al. No. 1,674,484, issued June 19, 1928, of which a number are in use at present. Even on such engraving machines, which are fully automatic in all operations except for placing the type wheels on the machine and removing the finished work therefrom, only one character may be engraved at a given time on the plurality of type wheels which the machine is adapted to accommodate at one time. After engraving one character on each of the plurality of type wheels, the machines automatically indexes all of the wheels and engraves the next figure, and so on until the last figure is engraved on the wheels, after which the machine is automatically stopped and the finished work is then manually removed from the machine. Obviously such engraving machines require the constant attention of an operator.

Some success has also been met with heretofore in knurling, kneading and rolling the characters onto the type wheels. All of the methods known to the applicant for so raising the characters on type wheels requires that a previously manufactured blank type wheel be manually placed in position in the knurling machine, and after the knurling or kneading operation is completed, be manually removed from the machine and placed in another machine to trim and finish the wheel. Such machines, therefore, require the constant attention of an operator which at once defeats economic production, decreases the output and slows down the process of manufacture of the type wheels.

Up to the present time the final result of such kneading or knurling machines has been but mediocre. Several obstacles contribute to the previous inability to produce an inexpensive, yet satisfactory knurled type wheel. The more important of these obstacles is the apparent inability to raise a comparatively high figure having straight sides.

Distortion of the metal in type wheels due to great pressure required to form the figures.

Flaking off of metal forming the character, due to the rolling or knurling action.

Imperfection caused in the face of the characters by the air pocket created in the dies or matrices when they are pressed into the metal of the wheels to form the figure.

In order to take the great strain, sometimes amounting to a force of two or three tons, necessary to press the matrices into the wheel of steel or other suitable metal, the structures of some of the prior knurling machines have been ponderous and bulky.

These problems have all been met and solved in the present invention of which it is an object to provide a machine into which raw stock may be fed automatically and which, by automatically performing a series of operations on said stock, turns out completed type wheels.

Another object is to provide a novel knurling device adapted for use on a multiple spindle automatic screw machine whereby the knurling operation forms one step in a series of automatic continuous operations looking to the manufacture of completed type wheels.

Another object is to provide a novel device to knurl or roll figures having high, straight sides, onto type wheels.

Another object of the present invention is to provide a novel knurling machine to knurl figures onto type wheel stock before said stock is severed, thereby preventing distortion of the type wheels due to the great pressure required to raise the figures thereon.

Still another object is to provide a knurling device capable of rolling raised figures having high, straight sides on the type wheels without flaking or chipping off of the metal forming the characters due to the rotary action of rolling or kneading operations.

A further object of the present invention is to provide a knurling device in which the formation of air pockets in the dies is avoided, thus preventing the formation of imperfections in the face of the types.

Another object is to provide a knurling or kneading device of comparative light weight and structure and which possesses the inherent strength to dissipate the force necessary to knurl the figures on the metal type wheels.

Another object of the present invention is to provide a novel knurling tool for use on an automatic screw machine, the knurling tool having a plurality of convergent matrices, the inner end of each of which matrices is provided with a die, mechanism being provided to gradually force the matrices toward a common center to knurl a series of characters on the periphery of a cylindrical stock rotating tangent to the die ends of the matrices.

Another object is to provide a knurling device having a plurality of convergent matrices, each matrice having a die on the inner end thereof tangent to the periphery of the stock rotating on a fixed center, mechanism being provided to feed the matrices toward the center, pressing the die into the stock to knurl the figures thereon.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 1 is a fragmentary perspective view showing the knurling device in place on a conventional type multiple spindle screw machine.

Fig. 2 is a perspective view of the knurling device removed from the screw machine.

Fig. 3 is a detail longitudinal sectional view through the knurling device.

Fig. 4 is a view of the front end of the support member showing the work support and retainer.

Fig. 5 is a fragmentary sectional view of the front end of the support member, including the work, work support and the shifting wedge.

Fig. 6 is a fragmentary view of the coupling between the drive shaft 80—81.

Fig. 15 is a diagrammatic view of the inner ends of the matrices shortly after the beginning of the knurling operation and at the instant they are brought into contact with the periphery of the work.

Fig. 16 is a diagrammatic view of the inner ends of the matrices at the end of the feeding movement and before they are retracted.

Fig. 17 is a detailed view of the bar of stock projecting from the spindle and the tools which operate thereon at the first position.

Fig. 18 is a detailed view of the bar of stock projecting from the spindle and the tool which operates thereon at the second or knurling position.

Fig. 19 is a detailed view of the bar of stock projecting from the spindle and the tools which operate thereon at the third position.

Fig. 20 is a detailed view of the bar of stock projecting from the spindle and the gear cutters which operate thereon at the fourth position.

Fig. 21 is a detailed view of the bar of stock projecting from the spindle and the tools which operate thereon at the fifth position.

Fig. 22 is a perspective view of one of the matrices.

General description

Figure 7:
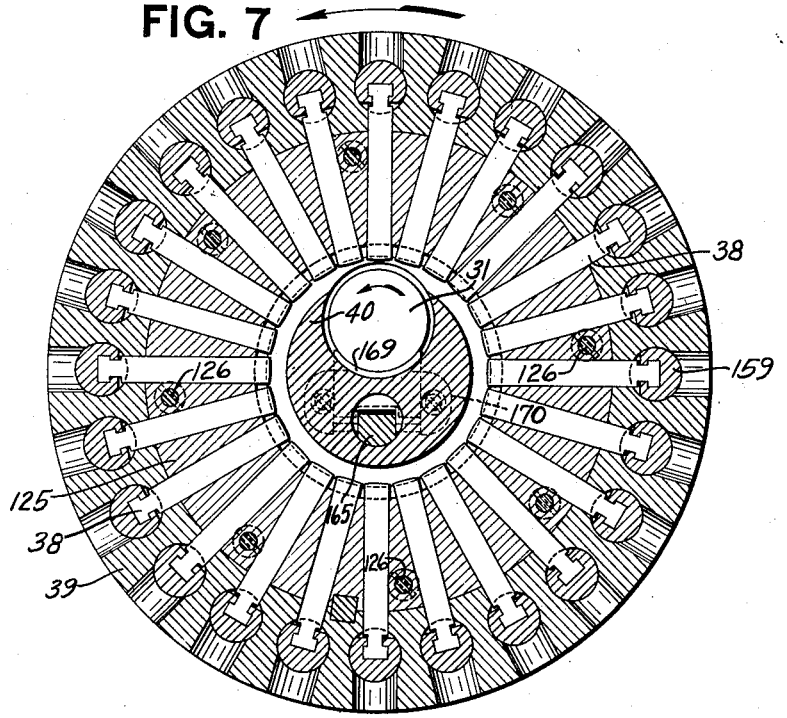
Fig. 7 is a sectional view through the matrix carrier taken vertically on line 7—7 (Fig. 3).
Figure 8:
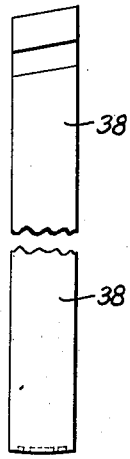
Fig. 8 is a view in front elevation of one of the matrices.
Figure 9:
Fig. 9 is a view in elevation of the die end of one of the matrices.

Before describing the knurling attachment itself, it is thought that a brief description of a representative type of screw machine on which the device is adapted to be used, will be helpful in understanding, not only the operation of the knurling attachment itself, but also the series of operations, including the knurling operation, looking to delivery of the completely finished parts from the machine into which the raw stock is fed.

A multiple spindle automatic screw machine of the National Acme type, such, for instance, as is disclosed in the patent to A. E. Drissner et al., No. 1,320,609, issued November 4, 1919, is chosen for illustrative purposes. The knurling device is shown, as in Fig. 1, in operating position on such a machine. It is to be understood that the selection of this machine is purely arbitrary and it is obvious from inspection of the drawings that by few mechanical changes the knurling device can be readily and easily adapted to other conventional types of screw machines.

Such an automatic screw machine is provided with a plurality of spindles varying in number, as determined by the nature of the work to be done. The particular machine chosen to illustrate the present invention being provided with five spindles 30, each carrying a bar of stock 31. These spindles 30 are carried in a rotating cylinder 32, which is automatically indexed or rotated one step of movement between operations to successively bring the work into line with the various tools in the tool slides, the cylinder being locked between spacing movements to permit the tools to cut the work to the desired shape. All of the tools for the various operations work simultaneously so that at each time the tools are withdrawn from the work one piece is completed and discharged from the machine, or five pieces are completed at each complete rotation of the spindle cylinder 32.

Some of the tools are carried on a main tool slide 33 and the remainder are carried on cross slides 34 and 35, suitably mounted on the main bed 36 of the machine. All of the tools are simultaneously and automatically brought into operative relation with the work and then after completion of the operation are withdrawn from the work to permit indexing, or rotation of the spindle cylinder 32 to progressively advance the work.

The stock is fed through spring collets against a rigid stop 37 which is adjustable for different lengths or feeds. The stop 37 swings into place just before the stock is fed and does not interfere with the operation of the tools. After gauging the length of the stock the stop swings clear of the tool, thus permitting the use of tools in the position at which the stock is fed out.

The usual cams, not shown, are povided for operating the tool slides 33, 34 and 35, feeding the stock operating the spindles 30, indexing the spindle cylinder 32, etc., but it is thought unnecessary to burden this specification with a detailed description thereof. A full and complete understanding of screw machines of the type chosen for illustrative purposes may be had by reference to the above referred to patent, No. 1,320,609, issued to A. E. Drissner et al.

Such machines may be driven by any suitable means, the present practice being to drive the machines by an individual electric motor, or by belt from the conventional line shaft which in turn may be operated from any suitable source.

The knurling attachment is adapted to be mounted on the main tool slide 33 of the screw machine and its function is to knurl raised figures or characters on the periphery of type wheels such as are used in cash registers or any other machines where rotatable type carriers are used. By slight changes in the matrices, etc., the attachment may be easily adapted to knurl gears, pinions, reading counter wheels, etc.

In general, the knurling attachment itself includes a plurality of convergent matrices 38, slidably mounted in a matrix carrier 39 journaled on, but slidable longitudinally with a hollow support shaft comprising, for convenience of manufacture, two support shafts 40 and 41, the rear end of the shaft 40 fitting within the large forward end of the shaft 41. A key 42 prevents relative rotary motion between the sleeves and set screws 43 join the sleeves so that they slide longitudinally as a unit. The support shaft 40—41 is slidably carried in two brackets 44 and 45 secured to the main tool slide 33 and in a frame 46 projecting upwardly from the bed 36 of the machine.

The main tool slide 33 and the cross slides 34 and 35 are moved toward the spindle cylinder 32 after each indexing movement of the cylinder to bring the assembled tools into operative relation with the bars of stock 31, and after completion of the operation the main tool slide 33 and the cross slides 34 and 35 are withdrawn to permit indexing of the spindle cylinder 32.

The operation other than the knurling operation for completing the type wheels from the bars 31 of raw stock are, in the first position, or the first operation on the stock after it is fed and gauged, to cut an annular groove 47 around the stock, the full diameter stock remaining on the end representing the width of the type wheel, and to machine the peripheral surface of the stock as indicated at 48 by a cutting and shaping tool 50, secured on a block 51 mounted on the cross slide 34.

The purpose of cutting the groove 47 before knurling operations is to provide a space for the surplus metal which is squeezed out by the knurling operation.

A drill 52 fixed in a bracket 53 mounted on the main tool slide 33, when the slide 33 is moved into operating relation with the work, spot-drills the end of the stock as indicated at 54.

The stock is now in the shape illustrated in Fig. 17.

When the above operation has been performed on the stock 31, the tool slides are withdrawn and the spindle cylinder indexed, after which the tool slides are again actuated to bring the tools into operative relation with the stock for the second operation thereon.

In the second position, or at the second operation, the knurling attachment moves over the stock which has been grooved and spot-drilled, and knurls the characters on the periphery of the partly formed type wheel 55, the surplus metal 56 being forced into the groove 47 and to the side of the partly formed type wheel 55. The work end of the stock now appears as illustrated in Fig. 18.

While the figures were being knurled on the stock in the second position another bar of stock was being grooved and spot drilled in position one.

The slides are again withdrawn, the spindle cylinder index and the tools moved back into operative relation for the third operation.

At this, the third position, a cutter 57 (Fig. 19) shaves the surplus metal 56 from the face of the partly-formed wheel 55 and a drill 58 fixed in a jig 59 clamped in a bracket 60 on the main tool slide 33 drills a hole 61 into the end of the rotating stock 31, after which the tools are again withdrawn to permit indexing of the spindle cylinder 32.

At the fourth position a gear cutter 62 (Fig. 20) of any conventional design cuts away the metal ridges formed between characters at the knurling operation and cuts tooth spaces between the characters.

After the tools are withdrawn and the cylinder 32 indexed following the fourth operation, the tools are again returned to operative relation with the work. At this time, in addition to the other four simultaneous operations just described, a reamer 75 (Fig. 21) fixed in a jig, secured in a bracket (not shown) on the main tool slide 33 enlarges the hole 61 drilled in the third position. Also in this position a cutting tool carried on a cross slide (not shown) trims the surplus metal from the inner face of the wheel 55 and cuts the completed wheel from the bar of stock.

The cylinder 32 is again indexed, carrying the bar of stock from which the completed work was severed in the fifth position, to the first position, the stock being automatically fed as each bar of stock arrives in the first position.

Figure 11:
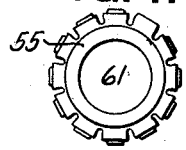
Figs. 11 and 12 are detail views of a completed type wheel as delivered from the screw machine after the several operations have been completed.
Figure 12:

This progressive operation continues, completing one type wheel 55 (Fig. 11) at each indexing of the cylinder until the bars of raw stock are finally exhausted, when they may be replaced and the operation of the machine continued.

From the above it can be seen that by use of the knurling device, hereinafter described in detail, in combination with a multiple spindle automatic screw machine of the National Acme type, of which a brief description was given above, or any of the other conventional types of such machines now on the market, type wheels or other articles of manufacture on the periphery of which designs are to be knurled, may be completely and automatically manufactured from the raw stock without the constant attention of an operator and without removing the work from the machine until the completely finished article is discharged therefrom.

It is to be understood that the above described screw machine and the tools appurtenant thereto excepting the knurling device is old and only forms a part of the present invention when said knurling device is combined therewith to form a new and useful method for the manufacture of type wheels, counter wheels, date wheels, pinions, etc.

Knurling attachment

The knurling device may be divided roughly into three parts, namely, the supporting and locating shaft 40—41, the matrix carrier 39 and the drive shaft 80—81 therefor, and mechanism to feed the matrices convergently toward their common center to bring the dies on the inner end thereof into contact with the periphery of the stock or work. These three mechanisms are operatively assembled together and a detailed description thereof will now be given.

It was stated above that the knurling device is supported in the brackets 44 and 45 and in the frame 46. It is to be understood, however, that the device is not rigidly supported in the brackets 44 and 45, cleanances being provided to permit slight flexing of the parts near the frame 46. The device is yieldingly held in the bracket 44 and the bracket 45 is provided with sufficient clearance that it acts more as a guide than as a support.

The purpose of the resilient support and of the flexing of the device near its rear end is to permit a slight shifting of the center of the matrix carrier to compensate for changes in the diameter of the work end of the matrices, as will be more fully brought out later in the specification.

Figure 14:
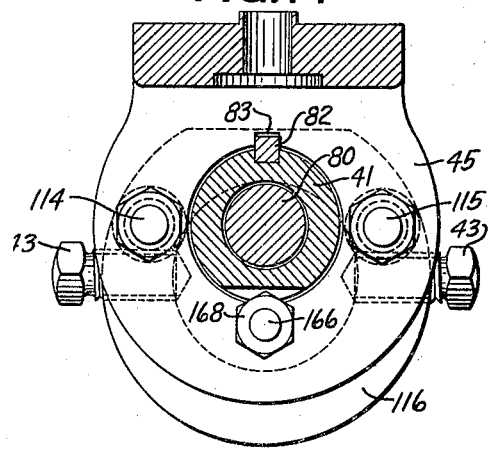
Fig. 14 is a sectional view taken on line 14—14 (Fig. 3).

The supporting shaft, comprising the coupled shafts 40 and 41, acts as a support extending throughout the length of the device and upon which the matrix carrier rotates. A key 82 set in a keyway in the shaft 41 rests in a groove 83 in the bracket 45 to prevent rotary movement of the support shaft 40—41, at the same time permitting transitory movement thereof relative to the bracket 45. The bracket 45 does not act as a bearing for the shaft 40—41, there being a clearance provided therein (see Fig. 14).

The support shaft 40—41 is resiliently supported in the front bracket 44 in the following manner.

A short sleeve or collar 84 having an annular flange 85 at its forward end surrounds the support shaft 40 within the bracket 44. A matrix operating ring 86 surrounding the rear end of the sleeve 84, is coupled thereto by opposed coupling studs 87 and 88 (Fig. 13) held in their proper places in the ring 86 by set screws 89 and 90, in one end of the ring 86. The studs 87 and 88 are flattened in their middle portion, as indicated at 91 and 92 to fit within slots formed in flanged bushings 93 and 94 in the front bracket 44. The reduced and threaded outer ends 100 and 101 of the studs 87 and 88 project through clearance holes in the bushings 93 and 94 respectively, and washers 102 and 103 of a somewhat larger diameter than the holes in the bushings 93 and 94 are held against the ends of the bushings by lock 104, the flanges of the bushings resting against milled bosses on the front bracket 44.

Obviously, by loosening the lock nuts on one of the studs 100 or 102 and tightening them on the opposite one of these studs, the supporting and locating shaft 40—41 may be shifted laterally in the front bracket 44, the purpose being to provide for horizontal (as viewed in Figs. 3 and 13) adjustment of the knurling device. At the same time a slight vertical movement thereof is permitted, as viewed in these two figures, the flat surfaces 91 and 92 of the studs 87 and 88 being free to move vertically. The washers 102 and 103, at this movement, slide over the face of the bushings 93 and 94.

A restraining and restoring spring 105 sets between a washer 106 abutting against a milled base on the bracket 44 and a nut 107 on the outer end of a long stud 108 secured in the ring 86 and projecting at substantially right angles to the stud 87 and 88 through a clearance opening 109 in the bracket 44, normally presses the periphery of the ring 86 against two set screws 110 and 111 set radially in the front bracket 44, and being spaced one on each side of the stud 108 and apart therefrom.

Figure 13:
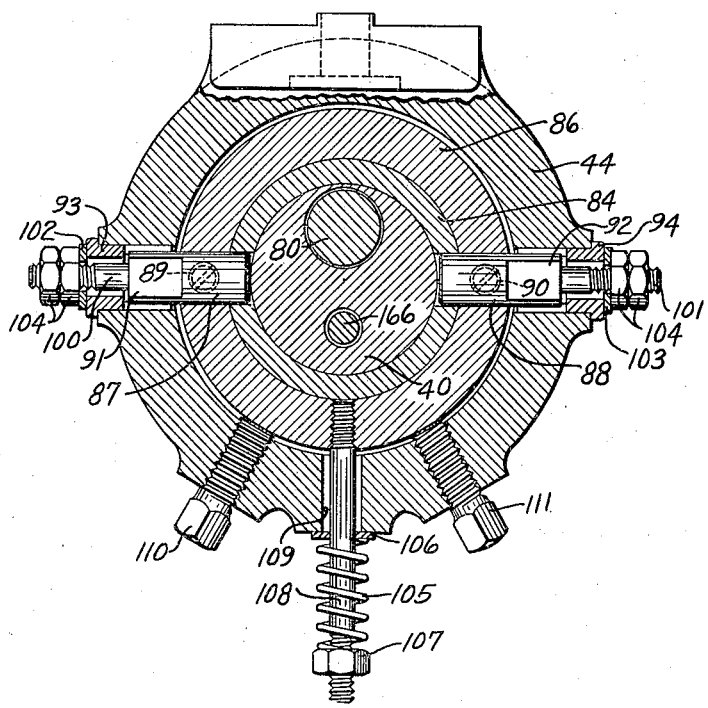
Fig. 13 is a sectional view taken through the front bracket on line 13—13 (Fig. 3).

From the foregoing description it can be seen, that, as viewed in Fig. 13, the support shaft 40—41, the sleeve 84 and the ring 86 may be raised vertically against the tension of the spring 105, but are held against horizontal movement by the studs 87 and 88 and their lock nuts 104.

The means for so shifting the support shaft 40—41 and the reason for so doing will be brought out later in the specification.

It was stated above that the main tool slide 33 carries the knurling device forward into position to operate on the end of the bar of stock 31, projecting from the end of the spindle 30. This is accomplished by the rear bracket 45 secured to and moving with the main tool slide.

Springs 112 and 113 (Fig. 2) coiled about spring pilots 114 and 115 respectively secured in a shoulder 116 of the support shaft 40—41 and projecting rearwardly through clearance holes in the bracket 45, are compressed between the shoulder 116 and spring seats in the bracket 45. Lock nuts 117 are provided on the end of the spring pilots 114—115 to retain the springs when removing the knurling device from the machine, as will be described later.

These springs 112—113 normally hold the enlarged, forward end of the tubular support shaft 41 against the rear end of the ring 86, so that as the main tool slide 33 is given its forward movement, the rear bracket 45, by the springs 112 and 113, carries the tubular support shaft 40—41 therewith until forward movement of this shaft is arrested by a stop collar 118 locked on the rear end of the shaft 41 by lock collar 119, striking the right-hand side, as viewed in Figs. 1 and 3 of the frame 46.

This forward movement of the slide to operative location is rapid and, after the matrices are in vertical alignment with the work, the forward movement of the main tool slide 33 is slowed down for the actual knurling operation. This rapid initial movement also brings the remainder of the tools on the main tool slide 33 quickly to their respective cutting positions.

The collars 118 and 119 are provided with holes, spaced at regular intervals about their periphery to receive a spanner wrench pin whereby the collars may be rotated to change their lateral location on the shaft 41, thus determining the point at which the tubular support shafts 40 and 41 and the matrix carrier 39 carried thereby, will be stopped at the forward movement of the main tool slide, which receives its regular stroke, continuing its forward movement and merely compressing the springs 112—113 after the collar 118 has stopped the support shaft 40—41 in the operating position relative to the work 31 projecting from the spindle 30.

The matrix carrier 39, which, as just described, is rotatably mounted on the forward end of the tubular support shaft 40—41 comprises a carrier 39 and a hub 125 secured thereto by a plurality of screws 126. The matrix carrier 39 rotates on a bushing or bearing 127 pressed over the support shaft 40. The hub 125 rotates on a bearing 128, also pressed over the support shaft 40.

The right-hand end as viewed in Fig. 3, of the hub 125 is counterbored to receive a ring gear 129, secured therein by screws 130. The matrix carrier 39 and the hub 125 are held in place on the tubular support shaft 40—41 by a collar 131 secured to the shaft 40—41 by set screws 132, there being a suitable opening 133 in the hub 125 through which the set screws may be inserted.

A pair of thrust washers 134 is inserted between the gear 129 and a shoulder on the shaft 40. The collar 131 and the shoulder on the shaft 40 against which the washers 134 press, prevents lateral movement of the matrix carrier 39 and its hub 125 on the support shaft 40 and insure that the matrix carrier will be moved forward to the proper position with the shaft 40—41.

A bearing 145 pressed on the left-hand end of the shaft 80 rotates in a cylindrical opening 146 in the support shaft 40, the bearing being slightly larger than a pinion 135 on the drive shaft 80—81.

To rotate the matrix carrier 39, the pinion 135 on the drive shaft, comprising the coupled shafts 80 and 81, journaled respectively in the tubular support shafts 40 and 41, meshes with the internal ring gear 129.

A pair of lock nuts 136 (Fig. 6) set on the right-hand end as viewed in Fig. 3, of the shaft 80, holds a bushing 137 against a shoulder in the shaft 40 and prevents longitudinal movement of the shaft 80 relative to the support shaft 40. The enlarged left-hand end of the shaft 81 embraces the right-hand end of the shaft 80 (see Fig. 6) and a tongue 138 on the right-hand edge of the shaft 80 rests within a groove 139 in the shaft 81, thereby forming an effective coupling between the shafts 80—81, which coupling also forms a convenient means for assembling and disassembling the device.

As viewed in Fig. 3, the right-hand end of the shaft 81 slides within a thimble 140 secured on the end of a continuously rotated shaft 141 driven from the main operating mechanism (not shown) of the screw machine. The thimble 140 is keyed to the shaft 141 by a key 142 set in a keyway in the shaft 141 and projecting into a keyway 143 in the thimble 140. A key 144 set in a keyway in the shaft 81 also slides in the keyway 143 of the thimble thereby forming a slidable coupling between the shafts 81 and 141.

Figure 10:
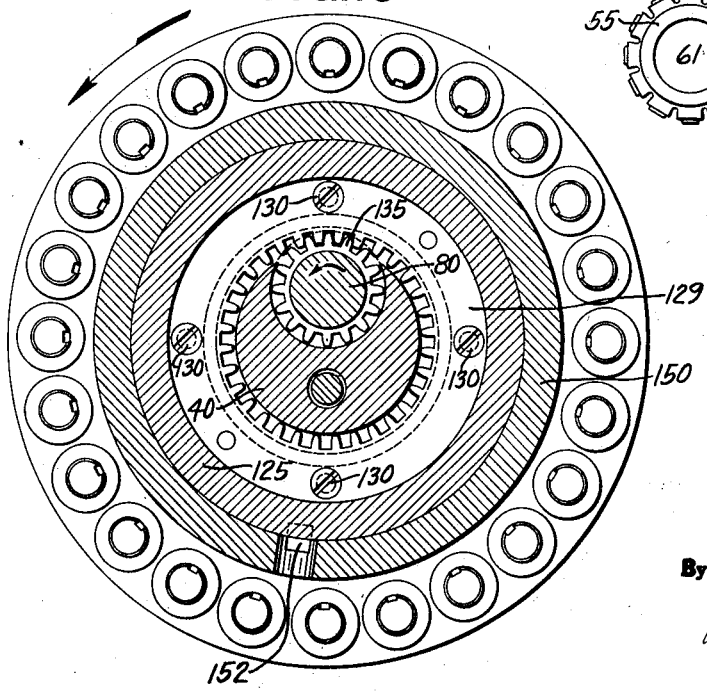
Fig. 10 is a vertical sectional view through the matrix carrier taken on line 10—10 (Fig. 3).

With this coupling and the coupling 138—139 in the shaft 80—81 it can be seen that the shafts 141, 80—81 and the gear 135 rotate counter-clockwise as viewed in Fig. 10, continuously while the machine is in operation, to rotate the matrix carrier 39 in the same direction at one-half the speed of the drive shaft 80—81.

After the collar 118 arrests the forward movement of the tubular support shaft 40—41 and the matrix carrier 39 in the proper position in relation to the partly formed type wheel 55, the main tool slide 33 continues its forward travel at a slower speed, carrying the brackets 44 and 45 therewith. Continued forward movement of the front bracket 44 shoves forwardly therewith a wedged operating drum 150 surrounding the hub 125 of the matrix carrier 39. The drum 150 has an inwardly extending flange 151 at its rear end, projecting into an annular groove formed by the flange 85 on the sleeve 84 and the forward end of the ring 86. The drum 150 is adapted to slide longitudinally on the hub 125 but rotates therewith due to a sliding keyway in the inner periphery of the drum 150 embracing a key 152 set in the circumferential face of the hub 125.

The wedged operating drum 150, when it moves forward under the influence of the main tool slide 33, simultaneously shoves forwardly therewith a series of push rods 153 grouped circumferentially above the drum 150 and having their rear ends projecting through a series of holes in a ring 154 carried by the drum 150.

Springs 155, the purpose of which will be later described, compressed between nuts 156 on the push rod 153, forwardly of the ring 154 presses nuts 157, locked in place on the rear end of the push rod 153 by lock nuts 158, against the rear side of the ring 154. The forward end of the push rods 153 are enlarged to form plungers 159 slidable in suitable holes 160, correspondingly grouped around the outer edge of the matrix carrier 39.

The inner, forward sides of these plungers are beveled to form wedges or inclined planes having formed therein T-slots (see Fig. 7) embracing the outer ends of the matrices 38 in such a manner that, at the forward movement of the plunger 159 the wedges thereon force the matrices 38 radially toward their common center, thus, as the matrix carrier 39 and the work 31 rotate (see Fig. 7) bringing the matrices 38 successively into rolling contact with the periphery of the partly formed type wheel 55.

The forward movement of the main tool slide, and consequently the drum 150 and the feed plungers 159 is comparatively slow, and while the plungers are being pushed forward their complete stroke to feed the matrices radially inwardly the proper distance to force the dies on the inner ends thereof into the metal of the type wheel stock, the matrix carrier 39 and the work 31 rotate in the same direction approximately 50 turns, whence it can be seen that the die is not pressed into the type wheels an entire step at one time, but gradually rolls the figures as the matrices slowly converge under the influence of the slowly advancing plunger 159.

The purpose of the springs 155 is to delay the feed of the matrices in actual contact with the work. It is not the purpose of the feed plunger 159 to actually press the dies into the metal of the type wheels, but to converge those matrices not in contact with the work so that as the matrices and the work rotate, the die end of each of the matrices is advanced inwardly slightly beyond the depth or point at which it was pressed into the type wheel on the last rotation of the matrix carrier. Now when the matrix rolls into the type wheel, the pressure of the die sinking into the metal presses the matrix against its feed plunger, which in turn is pressed with great force against the wall of the hole 160. To endeavor to force the plunger 159 forward at this time would impose an undue strain on the feed ring 150, and create an enormous friction between the flange 151 of the drum 150 and the ring 86, hence the springs 155, which, when the matrices come into contact with the work and the resulting pressure holds the plunger against forward movement, compresses and permits the ring 154 to continue its slow forward movement. As soon as a particular matrix clears the work the spring 155 associated with its particular plunger 159 expands, forcing the plunger forward and quickly feeds the matrix into line with the remainder of the matrices, then free of the work.

It was mentioned above that during the knurling operations, that is, when the matrices are being fed inwardly to roll the figures on the type wheels, the center of the matrices is shifted slightly in relation to the center of the work. The purpose of this shifting of the center of the matrix carrier is to maintain a constant ratio between the diameter of the line formed by the die faces on the inner ends of the matrices and the diameter of the type wheel.

The desirability, or rather the necessity for maintaining the constant ratio is best explained by an example, as follows:

When, the main tool slide 33 shifts the knurling device forwardly and the collar 118 striking the frame 46, stops the matrix carrier 39 in the proper position relative to the work, there is a slight clearance between the die end of the matrices 38 and the periphery of the stock 31 as is clearly illustrated in Fig. 7 of the drawings. This clearance is then gradually taken up as the feed drum 150 shoves the plungers 159 forwardly to converge the matrices, the dimension of the parts being such that at the instant the die ends of the matrices arrive at the point of tangency with the circumference of the type wheel stock 31 (Fig. 15), the diameter of the circular line touching the die ends of the matrices is exactly two inches, whereas the diameter of the stock 31 is exactly one inch, forming a ratio of 2 to 1 between the diameter of the faces of the matrices and the diameter of the stock.

At this point the distance between the radial center lines of the matrices at the intersection of the center line thereof and the circumference of the circle formed by the die end of the matrices is approximately .2618 inches, the circumference of the circle being 6.2832 inches, and there being 24 matrices provided in the illustrative embodiment of the machine. Since there are to be twelve characters knurled on the periphery of the type wheels, whose circumference is 3.1416 inches, the intercharacter spaces are likewise .2618 inches. It can be seen, therefore, that at the beginning of the actual knurling (see Fig. 15), the twenty-four dies, forming a circle two inches in diameter, starts knurling twelve characters on a type wheel one inch in diameter, the matrices diametrically opposed bearing identical dies and operating on the same character on the type wheel. Both the dies and the characters, at this point in the operation, are spaced circumferentially .2618 inches apart.

It is desired to knurl the figures on the type wheels, let us say, for example, $\frac{1}{32}$ inch deep. At the end of the knurling operation the diameter of the stock at the point where the dies roll is $1\frac{5}{16}''$ instead of $1''$, as at the beginning of the operation, making the circumference 2.9452'' and the space between the characters at this point .2454''. If the matrices were fed inwardly only the $\frac{1}{32}''$ necessary to knurl the characters $\frac{1}{32}''$ high, the diameter of the circle formed by the dies at the end of the knurling operation would be $1\frac{15}{16}''$, the circumference of the circles would be 6.0868'' and the space between dies would be .2536'', but the space between characters on the type wheels at this time is .2454'' or a difference of nearly .02'', sufficient variation in spacing to cause the dies to flake off pieces of the partially formed characters and otherwise mutilate the figures.

If the ratio of 2 to 1 between the diameter of the work and the circle formed by the dies is maintained, this difficulty is overcome. Therefore, instead of feeding the matrices convergently $\frac{1}{32}''$ the feed drum 150 moves forward far enough to feed the matrices $\frac{1}{16}''$, thus reducing the diameter of the circle formed by the dies to $1\frac{7}{8}''$, and its circumference to 5.8905''. At this circumference the twenty four dies are spaced .2454'' apart, corresponding exactly to the space between the characters on the type wheels at a diameter of $1\frac{5}{16}''$. However, since it is necessary to feed the matrices $\frac{1}{16}''$ and the characters are to be knurled only $\frac{1}{32}''$ high, it is necessary to shift the center of the matrix carrier 39 toward the stock 31, $\frac{1}{32}''$. This position of the matrices and the type wheels at the end of the knurling operation is clearly shown in Fig. 16.

The means for shifting the center of the matrix carrier 39 includes a shifting wedge 165 (Fig. 3) secured on the forward end of a push rod 166, extending through a suitable opening in the support shaft 40—41 and having its rear end projecting through and secured to the rear bracket 45 by nuts 167 and 168. The lower side of the wedge is rounded to slide in a trough in the support shaft 40, and the upper face is inclined toward the rear. A work support 169, having a concave upper edge, rests upon the inclined face of the wedge and is held in place by a retainer 170 (Fig. 4) set in a recess in the forward end of the support shaft 40, being secured thereto by screws. The concave upper edge of the support 169, inclines slightly toward the forward end of the slide to provide clearance for the work when the knurling device is advanced toward the rotating bar of stock 31. The lower edge of the retainer 170 is notched at 171 (Fig. 4) to clear the wedge, the notch 171 being shouldered at 172 and 173, to receive feet 174 and 175 projecting forwardly from the bottom of the work support 169 to limit the radial movement of the work support 169 toward the work center.

When the main tool slide 33 and the brackets 44 and 45 carry the tubular support shaft 40—41, the matrix carrier 39 and the thrust rod 166 forwardly, these parts move as a unit until the collar 118 strikes the frame 46 and arrests the forward movement of the support shaft 40—41 and the matrix carrier 39. At this time the main tool slide 33 and the brackets 44 and 45 continue their forward movement, the bracket 44 advancing the feed drum 150, which by the push rod 153 feeds the matrices, and the bracket 45 continues to advance the push rod 166 and the wedge 165, the rod and wedge now moving forwardly relative to support shafts 40—41. As the wedge 165 moves forwardly it falls away from beneath the work support 169 and, at the same time the plungers 159 are being pressed forwardly to feed the matrices inwardly. These combined movements, that is, the wedge 165 receding from under the support 169 and the matrices moving inwardly occurring at the same time, the pressure of the matrices on the upper side of the rigidly centered type wheel stock 31 moves the center of the matrix carrier 139 gradually toward the center of the work, the movement being controlled by the forwardly moving wedge 165.

When the limit of the forward movement of the feed drum 150 and of the wedge 165 is reached and the characters are knurled to the proper height, in accordance with the above example, the center of the matrix carrier 139 has been moved $\frac{1}{32}''$ closer to the center of the stock 31, the movement causing the support shaft 40—41 to bend or flex slightly at a point near the frame 46 where a clearance notch 176 (Fig. 3) is cut in the shaft 41 to prevent binding in the frame 46.

When, as above described, the forward end of the tubular support shaft 40—41, including the matrix carrier 39, is shifted, the shaft 40 carries the sleeve 84 and ring 86 upwardly, as viewed in Fig. 13 against the tension of the compressed spring 105, the studs 87 and 88 sliding in their respective slotted bushings 93 and 94.

As soon as the knurling operation is completed and the drum 150 commences its rearward travel, removing the pressure from the matrices, the spring 105 expands and gradually restores the tubular support shaft 40—41 and the matrix carrier 39 to their normal position with the ring 86 pressing against the set screws 110 and 111.

Restoring movement of these parts is controlled by the wedge 165 as it is drawn rearwardly by the bracket 45, the tubular support shaft 40—41 being held in its forward position by the springs 112 and 113 (Figs. 1 and 2) until the receding drum 150, by the plungers 153—159, has drawn the matrices 38 radially outward to their normal position. At this time the rear end of the ring 86 comes into contact with the forward end of the support shaft 41 and carries the shaft 40—41 and the matrix carrier 39 therewith the remainder of its rearward travel to normal position. The early part of the rearward travel of the main tool slide 33 is slow until the matrices are clear of the type wheel, when the speed of the movement is increased in order to speed up the overall operations of the machine.

After the knurling device is withdrawn from operative relation with the work by the rearward movement of the main tool slide 33, the spindle cylinder 32 is again indexed to progressively advance the work to the next operation, and bring the next spindle 30 with its rotating bar of stock 31 into alinement with the knurling device.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a knurling machine; the combination of a support member; a matrix carrier on the support member; means to rotate the matrix carrier; a plurality of matrices; and means to feed the matrices.

2. In a knurling machine; the combination of a support member; a matrix carrier rotatably mounted on the support member; means to rotate the matrix carrier; a plurality of convergent matrices; and means to feed the matrices.

3. In a knurling machine; the combination of a tubular support member; a matrix carrier rotatably mounted on the support member; a shaft to rotate the matrix carrier; a plurality of convergent matrices; and means to move the matrices radially in the matrix carrier.

4. In a knurling machine; the combination of a tubular member; a matrix carrier rotatably mounted on the support member; a shaft to rotate the matrix carrier; a plurality of convergent matrices slidably mounted in the matrix carrier; and means movable longitudinally of the matrix carrier to feed the matrices radially in the carrier.

5. In a knurling machine; the combination of a tubular support member; a matrix carrier rotatably mounted on the support member; a shaft rotatably mounted within the tubular support member to rotate the matrix carrier; a plurality of matrices slidably mounted in the matrix carrier; and means movable longitudinally of the matrix carrier to feed the matrices radially.

6. In a knurling machine; the combination of a tubular support member; a matrix carrier rotatably mounted on the support member; a shaft rotatably mounted within the support member to rotate the matrix carrier; a plurality of convergent matrices slidably mounted in the matrix carrier; means to move the matrix carrier longitudinally to its operative position; and means to feed the matrices.

7. In a knurling machine; the combination of a tubular support member, said support member being provided with an opening to receive work; a matrix carrier rotatably mounted on the support member; a plurality of convergent matrices slidably mounted in the matrix carrier, each of said matrices being provided with a die on the inner end thereof; a shaft rotatably mounted within the support member to rotate the matrix carrier; means to shift the matrix toward the work; means to stop the matrix carrier in line with the work; and means operated by the shifting means to move the matrices against the work.

8. In a knurling device; the combination of a tubular support member, the support member being provided with an opening to receive work; a matrix carrier rotatably mounted on the support member; means to prevent longitudinal movement of the matrix carrier relative to the support member; a plurality of convergent matrices slidably mounted in the matrix carrier, each of said matrices being provided with a die on its inner end; a shaft rotatably mounted within the tubular support member to rotate the matrix carrier; means to shift the matrix carrier toward the work; means to stop the matrix carrier in the proper position relative to the work; and slidable means to simultaneously move the matrices radially.

9. In a knurling device, the combination of a tubular support member, the support member being provided with an opening to receive work; a matrix carrier rotatably mounted on the support member; a shaft rotatably mounted within the support member to rotate the matrix carrier; means to prevent lateral movement of the matrix carrier relative to the support member; a series of matrices slidable radially in the matrix carrier, each matrix having a die on its inner end; means to shift the matrix carrier in one direction; means on the support member to stop the matrix carrier in a given position relative to the work; a series of plungers, one for each of the matrices; and a single means to operate the plungers to simultaneously move the matrices radially.

10. In a knurling device; the combination of a tubular support member; the support member being provided with an opening to receive work; a matrix carrier rotatably mounted on the support member; a shaft rotatably mounted within the support member to rotate the matrix carrier; means to prevent lateral movement of the matrix carrier relative to the support member; a series of matrices slidable radially in the matrix carrier, each matrix having a die on its inner end; means to shift the matrix carrier in one direction; means on the support member to stop the matrix carrier in a given position relative to the work; a series of plungers, one for each of the matrices; a drum adapted to move longitudinally of and to rotate with the matrix carrier; a ring on the drum cooperating with all of said plungers to simultaneously feed all of the matrices.

11. In a knurling device; the combination of a tubular support member; the support member being provided with an opening to receive work; a matrix carrier rotatably mounted on the support member; a shaft rotatably mounted within the support member to rotate the matrix carrier; means to prevent lateral movement of the matrix carrier relative to the support member; a series of matrices slidable radially in the matrix carrier, each matrix having a die on its inner end; means to shift the matrix carrier in one direction; means on the support member to stop the matrix carrier in a given position relative to the work; a series of plungers, one for each of the matrices; a drum; a ring on the drum cooperating with all of the plungers; and means operated by the matrix carrier shifting means to move the drum laterally of the matrix carrier to simultaneously feed all of the matrices.

12. In a knurling device; the combination of a support member; a matrix carrier on the support member; a plurality of matrices; means to move the matrices radially in the matrix carrier; and means to shift the center of the matrix carrier.

13. In a knurling device; the combination of a support member; a matrix carrier on the support member; a plurality of convergent matrices, each matrix having a die on its inner end; means to rotate the matrix carrier; means to move the matrices radially in the carrier; and means to shift the center of the matrix carrier.

14. In a knurling device; the combination of a tubular support member; a matrix carrier rotatably mounted on the support member; a shaft to rotate the matrix carrier; a plurality of convergent matrices, each matrix having a die on its inner end; means to move the matrices radially in the matrix carrier; and means to shift the center of the matrix carrier and support member.

15. In a knurling device; the combination of a tubular support member; a matrix carrier rotatably mounted on the support member; a shaft to rotate the matrix carrier; a plurality of convergent matrices, each matrix having a die on its inner end; means movable longitudinally of the matrix carrier to move the matrices radially in the carrier; and means movable longitudinally of the support shaft to shift the center of the support shaft.

16. In a knurling device; the combination of a tubular support member; a matrix carrier rotatably mounted on the support member; a shaft rotatably mounted within the tubular support member to rotate the matrix carrier; a plurality of convergent matrices slidably mounted in the matrix carrier, each matrix having a die on its inner end; means to move the matrices radially in the matrix carrier; and means movable longitudinally in the support to shift the center of said support and the center of the matrix carrier.

17. In a knurling device; the combination of a tubular support member; a matrix carrier rotatably mounted on the support member; a plurality of convergent matrices, each matrix having a die on its inner end; a shaft rotatably mounted within the support member to rotate the matrix carrier; means to shift the support member and the matrix carrier to operating position; means to move the matrices radially in the matrix carrier; and means operated by the shifting means to shift the center of the matrix carrier.

18. In a knurling machine; the combination of a tubular support member, said support member having an opening in the end thereof to receive work; a matrix carrier rotatably mounted on the support member; a drive shaft rotatably mounted in the tubular support member to rotate the matrix carrier; a plurality of matrices slidable radially in the matrix carrier, each matrix being provided with a die on its inner end; means to move the matrix carrier to operative position; means to stop the matrix carrier in operative position; means becoming operative after the matrix carrier arrives in its operative position, to feed the matrices radially in the carrier to bring the dies into contact with the work; and means to move the center of the matrix carrier relative to the center of the work.

19. In a knurling machine; the combination of a tubular support member, the member having an opening in the end thereof to receive work; a matrix carrier rotatably mounted on one end of the support member; a drive shaft rotatably mounted in the support member to rotate the matrix carrier; a series of matrices slidable radially in the matrix carrier, each of the matrices having a die on its inner end; means to shift the support member and the matrix carrier to operating position; means on the other end of the support member to stop the matrix carrier in operative position, the shifting means continuing its movement; a series of plungers, one for each matrix; a single means resiliently to advance the plungers to simultaneously feed all of the matrices; and means operated by the shifting means to move the matrix carrier laterally.

20. In a knurling device; the combination of a support member; a matrix carrier on the support member; a plurality of matrices, each matrix having a die on its inner end; means to rotate the matrix carrier; and resilient means to move the matrices radially in the carrier.

21. In a knurling device; the combination of a support member; a matrix carrier on the support member; means to rotate the matrix carrier; a plurality of convergent matrices, each matrix having a die on its inner end; and resilient means to feed the matrices.

22. In a knurling machine; the combination of a tubular support member; a matrix carrier rotatably mounted on the support member; a shaft to rotate the matrix carrier; a plurality of convergent matrices in the matrix carrier; and resilient means to feed the matrices radially in the carrier.

23. In a knurling device; the combination of a tubular support member; a matrix carrier rotatably mounted on the support member; a shaft within the tubular support member to drive the matrix carrier; a plurality of convergent matrices slidably mounted in the matrix carrier; and means movable longitudinally of the matrix carrier to resiliently feed the matrices.

24. In a knurling device; the combination of a tubular support member; a matrix carrier rotatably mounted on the support member; a shaft within the support member to drive the matrix carrier; a plurality of convergent matrices slidably mounted in the matrix carrier; resilient means to move the matrix carrier longitudinally to its operative position; and means to feed the matrices.

25. In a knurling device; the combination of a tubular support member; a matrix carrier rotatably mounted on the support member; a shaft within the support member to drive the matrix carrier; a plurality of convergent matrices slidably mounted in the matrix carrier; resilient means to move the matrix carrier longitudinally to its operative position; and means movable longitudinally of the matrix carrier to feed the matrices.

26. In a knurling device; the combination of a tubular support member; a matrix carrier rotatably mounted on the support member; a shaft within the support member to drive the matrix carrier; a plurality of convergent matrices slidably mounted in the matrix carrier; resilient means to move the matrix carrier longitudinally to its operative position; and resilient means to feed the matrices.

27. In a knurling device; the combination of a tubular support member; a matrix carrier rotatably mounted on the support member; a shaft within the support member to drive the matrix carrier; a plurality of convergent matrices slidably mounted in the matrix carrier; resilient means to move the matrix carrier longitudinally to its operative position; and resilient means movable longitudinally of the matrix carrier to feed the matrices.

28. In a knurling device; the combination of a tubular support member; a matrix carrier rotatably mounted on the support member; a shaft rotatably mounted within the support member to rotate the matrix carrier; a plurality of convergent matrices slidably mounted in the matrix carrier; resilient means to move the matrix carrier longitudinally to its operative position; means to feed the matrices; and means to move the center of the matrix carrier.

29. In a knurling device; the combination of a tubular support member; a matrix carrier rotatably mounted on the support member; a shaft rotatably mounted within the support member to rotate the matrix carrier; a plurality of convergent matrices slidably mounted in the matrix carrier; resilient means to move the matrix carrier longitudinally to its operative position; means movable longitudinally of the matrix carrier to feed the matrices; and means to move the center of the matrix carrier.

30. In a knurling device; the combination of a tubular support member; a matrix carrier rotatably mounted on the support member; a shaft rotatably mounted within the support member to rotate the matrix carrier; a plurality of convergent matrices slidably mounted in the matrix carrier; resilient means to move the matrix carrier longitudinally to its operative position; resilient means to feed the matrices; and means to move the center of the matrix carrier.

31. In a knurling device; the combination of a tubular support member; a matrix carrier rotatably mounted on the support member; a shaft rotatably mounted within the support member to rotate the matrix carrier; a plurality of convergent matrices slidably mounted in the matrix carrier; resilient means to move the matrix carrier longitudinally to its operative position; means resiliently movable longitudinally of the matrix carrier to feed the matrices; and means to move the center of the matrix carrier.

32. In a knurling device; the combination of a tubular support member; a matrix carrier rotatably mounted on the support member; a shaft rotatably mounted within the support member to rotate the matrix carrier; a plurality of convergent matrices slidably mounted in the matrix carrier; resilient means to move the matrix carrier longitudinally to its operative position; means movable longitudinally of the matrix carrier and rotatable therewith to feed the matrices; and means movable longitudinally of the support member to shift the center of the support member laterally.

33. In a knurling device; the combination of a tubular support member; a matrix carrier rotatably mounted on the support member; a shaft rotatably mounted within the support member to rotate the matrix carrier; a plurality of convergent matrices slidably mounted in the matrix carrier; resilient means to move the matrix carrier longitudinally to its operative position; means rotatable with the matrix carrier to feed the matrices resiliently; and means movable longitudinally of the support member to move the center of the support member laterally.

34. In a knurling device; the combination of a tubular support member; a matrix carrier rotatably mounted on the support member; a shaft rotatably mounted within the support member to rotate the matrix carrier; a plurality of convergent matrices slidably mounted in the matrix carrier; resilient means to move the matrix carrier longitudinally to its operative position; means movable longitudinally of the matrix carrier and rotatable therewith to feed the matrices resiliently; and means movable longitudinally of the support member to move the matrix carrier laterally.

35. In a knurling device; the combination of a support member; a matrix carrier rotatable on the support member and movable longitudinally thereto; a plurality of matrices; a drum rotatable with the matrix carrier; means to move the support member longitudinally; means to move the drum longitudinally with the support member; means to stop the support member and the matrix carrier in operative position, the drum continuing its longitudinal movement; and means operated by the continued movement of the drum to feed all of the matrices simultaneously.

36. In a knurling device; the combination of a tubular support member; a matrix carrier rotatably mounted on the support and movable longitudinally therewith; a plurality of matrices slidably mounted in the matrix carrier; a drum mounted on the matrix carrier, the drum being rotatable with the matrix carrier and being adapted to telescope over the matrix carrier; an internal gear secured to the matrix carrier; a shaft within the support member, the shaft having a gear thereon meshing with the first mentioned gear to rotate the matrix carrier; means to move the support member longitudinally to operative position; means to stop the support member in operative position; means becoming effective after the support member is stopped to telescope the drum over the matrix carrier; and means intermediate the drum and the matrix carrier to simultaneously feed all of the matrices.

37. In a knurling device; the combination of a matrix carrier; a support member therefor; means to move the matrix carrier laterally in one plane; and means to prevent lateral movement of the matrix carrier in another plane.

38. In a knurling device; the combination of a matrix carrier; a support member therefor; means to move the matrix carrier longitudinally; means to move the matrix carrier laterally in one plane; and means to prevent movement of the matrix carrier laterally in another plane.

39. In a knurling device; the combination of a rotatable matrix carrier; a support member therefor; means to rotate the matrix carrier; means to move the matrix carrier longitudinally while said carrier is rotating; means to move the matrix carrier laterally in one plane while the carrier is rotating; and means to prevent lateral movement of the matrix carrier in another plane.

40. In a knurling device; the combination of a matrix carrier; a support member therefor; means to move the matrix carrier laterally in one plane; and adjustable means to prevent lateral movement of the matrix carrier in another plane.

41. In a knurling machine; the combination of a rotatable matrix carrier; a support member therefor; means to move the matrix carrier laterally in one plane; and adjustable means to prevent lateral movement of the matrix carrier in another plane.

42. In a knurling machine; the combination of a rotatable matrix carrier; a tubular support member therefor; means to move the matrix carrier laterally in one plane; and means to prevent lateral movement of the matrix carrier in another plane.

43. In a knurling device; the combination of a matrix carrier; a tubular support member therefor; means to move the matrix carrier laterally in one plane; and means to prevent lateral movement of the matrix carrier in another plane.

44. In a knurling device; the combination of a rotatable matrix carrier; a support member therefor; means to move the matrix carrier laterally in one plane; adjustable means to prevent lateral movement of the matrix carrier in another plane; and means to move the matrix carrier longitudinally.

45. In a knurling device; the combination of a rotatable matrix carrier; a tubular support member therefor; means to move the matrix carrier laterally in one plane; means to prevent lateral movement of the matrix carrier in another plane; and means to move the matrix carrier longitudinally.

46. In a knurling device; the combination of a matrix carrier; a tubular support member therefor; means to move the matrix carrier laterally in one plane; means to prevent lateral movement of the matrix carrier in another plane; and means to move the matrix carrier longitudinally.

47. In a knurling machine; the combination of a matrix carrier; a support member therefor; means to move the matrix carrier laterally in one plane; means to prevent lateral movement of the matrix carrier in another plane; and means to restore the matrix carrier laterally.

48. In a knurling machine; the combination of a matrix carrier; a support member therefor; means to move the matrix carrier longitudinally; means to move the matrix carrier laterally in one plane; means to prevent lateral movement of the matrix carrier in another plane; and means to restore the matrix carrier.

49. In a knurling device; the combination of a rotatable matrix carrier; a support member therefor; means to rotate the matrix carrier; means to move the matrix carrier longitudinally; means to move the matrix carrier laterally in one plane; means to prevent lateral movement of the matrix carrier in another plane; and means to restore the matrix carrier laterally.

50. In a knurling device; the combination of a matrix carrier; a support member therefor; means to move the matrix carrier laterally in one plane; adjustable means to prevent lateral movement of the matrix carrier in another plane; and means to restore the matrix carrier.

51. A method of manufacture of type wheels including the step of grooving the raw stock to receive surplus metal; and the step of knurling a series of characters on the stock.

52. A method of manufacture of type wheels including the step of knurling a series of characters on stock; and the step of removing the surplus metal from the type wheel.

53. A method of manufacture of type wheels including the step of knurling a series of characters on stock; and the step of cutting tooth spaces between the characters.

54. A method of manufacture of type wheels including the step of knurling a series of characters on stock before the wheel is severed from the stock; and the step of severing the wheel from the stock.

55. A method of manufacture of type wheels including the step of grooving the stock to receive the surplus metal; the step of knurling a series of characters on the stock; and the step of removing the surplus metal from the wheel.

56. A method of manufacture of type wheels including the step of grooving the stock to receive surplus metal; the step of knurling a series of characters on the stock; and the step of cutting tooth spaces between the characters.

57. A method of manufacture of type wheels including the step of grooving the stock to receive surplus metal; the step of knurling a series of characters on the stock; and the step of severing the wheel from the stock.

58. A method of manufacture of type wheels including the step of knurling a series of characters on the stock; the step of removing the surplus metal; and the step of cutting tooth spaces between the characters.

59. A method of manufacture of type wheels including the step of knurling a series of characters on the stock; the step of removing the surplus metal; and the step of severing the wheel from the stock.

60. A method of manufacture of type wheels including the step of knurling a series of characters on the stock; the step of cutting tooth spaces between the characters; and the step of severing the wheel from the stock.

61. A method of manufacture of type wheels including the step of grooving the stock to receive surplus metal; the step of knurling a series of characters on the stock; the step of removing the surplus metal; and the step of cutting tooth spaces between the characters.

62. A method of manufacture of type wheels including the step of grooving the stock to receive surplus metal; the step of knurling a series of characters on the stock; the step of removing the surplus metal; and the step of severing the wheel from the stock.

63. A method of manufacture of type wheels including the step of grooving the stock to receive surplus metal; the step of knurling a series of characters on the stock; the step of cutting tooth spaces between the characters; and the step of severing the wheel from the stock.

64. A method of manufacture of type wheels including the step of knurling a series of characters on the stock; the step of removing the surplus metal from the wheel; the step of cutting tooth spaces between the characters; and the step of severing the wheel from the stock.

65. A method of manufacture of type wheels including the step of grooving the stock to receive the surplus metal; the step of knurling a series of characters on the stock; the step of removing the surplus metal from the wheel; the step of cutting tooth spaces between the characters; and the step of severing the wheel from the stock.

In testimony whereof I affix my signature.

EDGAR WARNER.